(12) United States Patent
Saito et al.

(10) Patent No.: US 12,105,342 B2
(45) Date of Patent: Oct. 1, 2024

(54) LENS APPARATUS

(71) Applicant: CANON KABUSHIKI KAISHA, Tokyo (JP)

(72) Inventors: Yusuke Saito, Tokyo (JP); Makoto Hayakawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 710 days.

(21) Appl. No.: 17/319,374

(22) Filed: May 13, 2021

(65) Prior Publication Data
US 2021/0364726 A1 Nov. 25, 2021

(30) Foreign Application Priority Data

May 22, 2020 (JP) .................................. 2020-089830

(51) Int. Cl.
*G02B 7/02* (2021.01)
(52) U.S. Cl.
CPC .................................... *G02B 7/021* (2013.01)
(58) Field of Classification Search
CPC .......... G02B 7/021; G02B 7/102; G02B 7/02; G02B 7/023; G02B 7/04
See application file for complete search history.

(56) References Cited

U.S. PATENT DOCUMENTS

| 5,144,493 A * | 9/1992 | Nomura | G02B 7/10 359/825 |
| 6,069,745 A * | 5/2000 | Fujii | G02B 7/102 359/694 |
| 7,423,822 B2 | 9/2008 | Miyauchi | |
| 9,563,039 B2 | 2/2017 | Matsumoto | |
| 2003/0081325 A1 * | 5/2003 | Nomura | G02B 7/10 359/700 |
| 2007/0195429 A1 * | 8/2007 | Kobayashi | G02B 7/022 359/700 |
| 2009/0153985 A1 * | 6/2009 | Nagaoka | G02B 7/1805 359/733 |
| 2016/0018621 A1 * | 1/2016 | Matsumoto | G02B 7/102 359/824 |
| 2019/0025539 A1 * | 1/2019 | Yuri | G03B 17/12 |

FOREIGN PATENT DOCUMENTS

| JP | H01152315 U | 10/1989 |
| JP | 2007240955 A | 9/2007 |
| JP | 2015232596 A | 12/2015 |
| JP | 2018005135 A | 1/2018 |

* cited by examiner

*Primary Examiner* — George G. King
*Assistant Examiner* — Anna Smith
(74) *Attorney, Agent, or Firm* — ROSSI, KIMMS & McDOWELL LLP

(57) ABSTRACT

A downsized lens apparatus in which a degree of freedom in arrangement is improved is provided. A lens apparatus comprises: a first operation member configured to move an optical element along an optical axis direction; a first elastic member configured to transmit a force to the first operation member; a pressing member configured to change a force applied to the first elastic member according to the movement along the optical axis direction; a second operation member configured to move the pressing member along the optical axis direction; and a fixed element configuring at least a part of an exterior unit, wherein the pressing member is movably held by the fixed element along the optical axis direction, and the second operation member is rotatably held by the fixed element.

13 Claims, 8 Drawing Sheets

LENS APPARATUS

BACKGROUND OF THE INVENTION

Field of the Invention

The present invention relates to a lens apparatus.

Description of the Related Art

In a lens barrel that performs zooming and focusing by rotating an operation ring, a means for adjusting an operation force of the operation ring has conventionally been proposed.

For example, in Japanese Patent Laid-Open No. 2015-232596, a first elastic member provided between a first operation member and a second operation member, and a second elastic member provided at the first operation member are pressed by the second operation member to adjust an operating force of the first operation member.

Japanese Patent Laid-Open No. 2015-232596 discloses a configuration in which an extendable and retractable ring and a zoom adjustment ring, which are components of an operation force adjusting mechanism, are held in a guide cylinder disposed on the inner diameter of a component configuring an exterior unit. In such a configuration, an arrangement position of the operation force adjusting mechanism depends on the positional relation between the guide cylinder and the zoom operation ring, and as a result, a degree of freedom for the arrangement position of the operation force adjusting mechanism may be reduced. Additionally, unless an exterior component other than the operation force adjusting mechanism is arranged toward the outer diameter direction, the extendable and retractable ring and the zoom adjusting ring may not be able to access the guide cylinder, depending on the arrangement of the exterior components such as a focus operation ring, thereby causing an increase in the outer diameter of a product including the operation force adjusting mechanism, the lens apparatus, and the like.

SUMMARY OF THE INVENTION

An object of the present invention is, for example, to provide a downsized lens apparatus in which the degree of freedom of arrangement is improved.

A lens apparatus as one aspect of the present invention comprises: a first operation member configured to move an optical element along an optical axis direction; a first elastic member configured to transmit a force to the first operation member; a pressing member configured to change a force applied to the first elastic member according to the movement along the optical axis direction; a second operation member configured to move the pressing member along the optical axis direction; and a fixed element configuring at least a part of an exterior unit, wherein the pressing member is movably held by the fixed element along the optical axis direction, and the second operation member is rotatably held by the fixed element.

Further features of the present invention will become apparent from the following description of exemplary embodiments with reference to the attached drawings.

DESCRIPTION OF THE EMBODIMENTS

Figure 1:
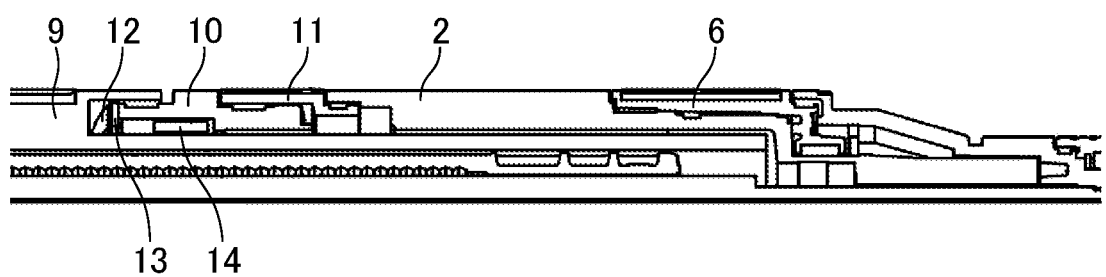
FIG. 1 is an enlarged partial cross-sectional view of a lens barrel of the first embodiment.

Hereinafter, preferred embodiments of the present invention will be described with reference to the accompanying drawings. In each drawing, the same reference numerals are provided for the same members and components, and duplicate explanations will be omitted or simplified.

First Embodiment

Hereinafter, an operation force adjusting mechanism of a lens barrel 100 according to the first embodiment will be described with reference to FIG. 1 to FIG. 4.

Figure 2:
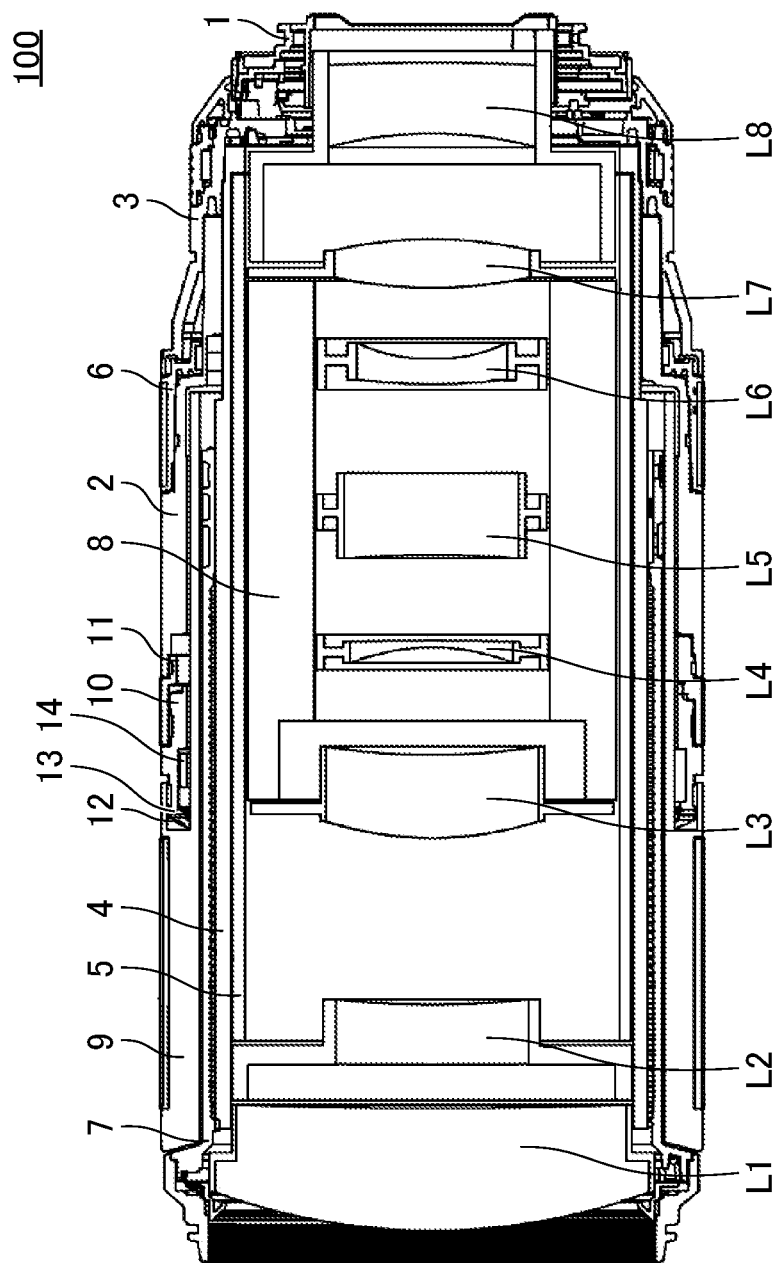
FIG. 2 is a cross-sectional view showing the lens barrel of the first embodiment.
Figure 3:
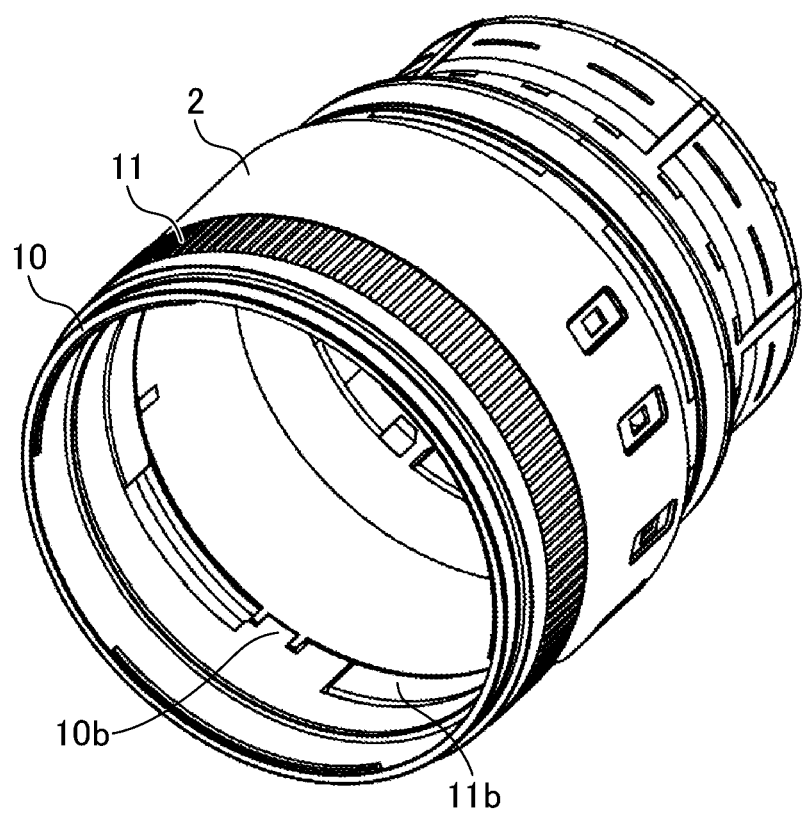
FIG. 3 is a perspective view of the main part of an operation force adjusting mechanism of the first embodiment as viewed from the inner diameter side.
Figure 4:
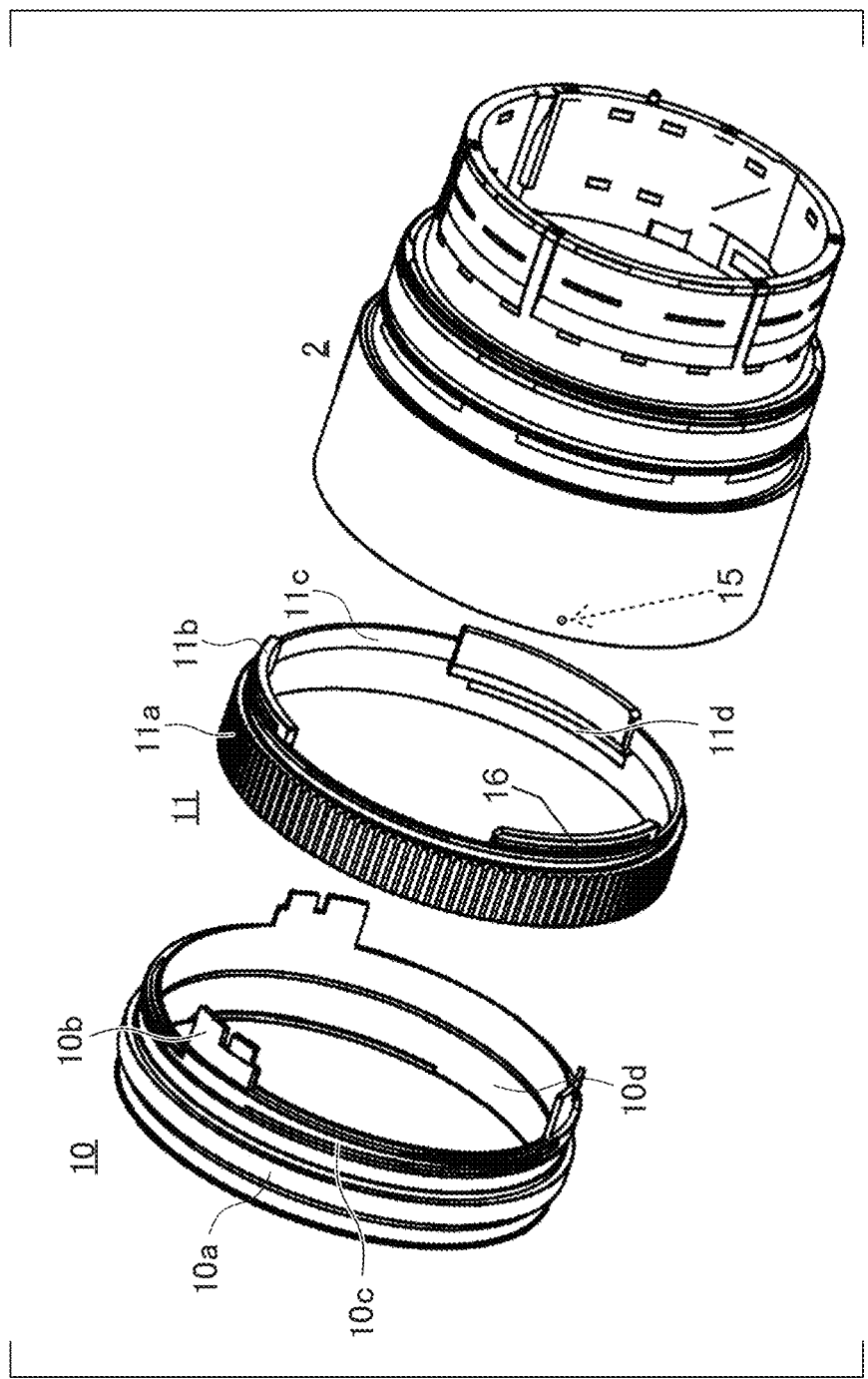
FIG. 4 is an exploded perspective view showing the main part of the operation force adjusting mechanism of the first embodiment.

FIG. 1 is an enlarged view of the operation force adjusting mechanism of the lens barrel (lens apparatus) 100 of the first embodiment. FIG. 2 is a cross-sectional view of the lens barrel 100 of the first embodiment. FIG. 3 is a perspective view of the main part of the operation force adjusting mechanism of the first embodiment as viewed from the inner diameter side. FIG. 4 is an exploded perspective view of the main part of the operation force adjusting mechanism of the first embodiment.

In FIG. 1 to FIG. 4, the lens barrel 100 holds (stores, supports) a shooting optical system including eight lens units from a first lens unit L1 to an eighth lens unit L8 (optical lens, optical element) in order from an object side to the image side (mount side). The shooting optical system forms an optical image of the object. The shooting optical system has a magnification varying (zooming) function for changing a focal length.

When zooming, the first lens unit L1, the third lens unit L3, the fourth lens unit L4, the fifth lens unit L5, the sixth lens unit L6, the seventh lens unit L7, and the eighth lens unit L8 move in the optical axis direction. In this context, the optical axis direction indicates a direction along the optical axis (a direction in which the optical axis of the shooting optical system extends). When focusing, the sixth lens unit L6 moves in the optical axis direction. The third lens unit L3, the fourth lens unit L4, the fifth lens unit L5, the sixth lens unit L6, and the seventh lens unit L7 are held by a second holding cylinder 8.

The lens barrel 100 configures the body of the lens barrel 100 and has a fixed barrel 3 and an exterior ring 2 serving as a fixed element that is attached to the fixed barrel 3 on the object side. Additionally, the lens barrel 100 has a mount 1 removably mounted on a camera body (not illustrated) (an image pickup apparatus, for example, a single lens reflex camera, and an optical apparatus). The camera body (not illustrated) has an image pickup element that photoelectrically converts light that has passed through the lens barrel 100 and can perform image pickup through the lenses of the lens barrel 100.

The first lens unit L1 is held by a first holding cylinder 7. The lens barrel 100 has a guide cylinder 4. The guide cylinder 4 is provided with straight groove portions (not illustrated) for guiding the first holding cylinder 7 and the second holding cylinder 8 at equal intervals in a direction around an optical axis (circumferential direction). In the first embodiment, three straight groove portions are provided.

A cam cylinder 5 is provided on the inner circumference of the guide cylinder 4. In the cam cylinder 5, cam grooves (not illustrated) formed to rotate accompanying the movement of the first holding cylinder 7 to drive the second holding cylinder 8 and the eighth lens unit L8 in the optical axis direction are respectively provided at equal intervals in the circumferential direction. In the first embodiment, nine cam grooves are provided. When the cam cylinder 5 rotates in the circumferential direction due to the movement of the first holding cylinder 7 in the optical axis direction while being guided due to the straight groove portion of the guide cylinder 4, the second holding cylinder 8 and the eighth lens unit L8 move in the optical axis direction while being guided due to the straight groove portion of the guide cylinder 4. Thus, zooming is performed.

A second lens unit L2, which is a fixed lens unit, is arranged on the inner circumference of the guide cylinder 4 and fixed on the guide cylinder 4.

The first holding cylinder 7 that holds the first lens unit L1 is arranged on the outer circumference of the guide cylinder 4. The first holding cylinder 7 is engaged with the cam groove formed on a zoom operation ring 9 and the straight groove portion formed on the guide cylinder 4, which will be described below, and is held movably only in the optical axis direction accompanying the rotation of the zoom operation ring 9.

The second lens unit L2, the second holding cylinder 8, and the eighth lens unit L8 are arranged on the inner circumference of the cam cylinder 5. The third lens unit L3 to the seventh lens unit L7 are arranged on the inner circumference of the second holding cylinder 8, and the third lens unit L3, the fifth lens unit L5, and the seventh lens unit L7 are held by the second holding cylinder 8.

A focus operation ring 6 is electrically connected to a focus motor unit (not illustrated). By rotating the focus operation ring 6, the fourth lens unit L4 and the sixth lens unit L6 are moved by the focus motor unit, and focusing is performed.

The zoom operation ring 9 is arranged on the outer circumference of the guide cylinder 4. The zoom operation ring 9 is provided with a cam groove (not illustrated) and the first holding cylinder 7 is engaged with the cam groove. Accordingly, when the zoom operation ring 9 is rotated, the first holding cylinder 7 moves in the optical axis direction. Thus, as described above, the first holding cylinder 7, the second holding cylinder 8, and the eighth lens unit L8 move in the optical axis direction. By this movement, the focal length can be changed. Thus, the zoom operation ring 9 is configured as a first operation member for moving the lens unit in the optical axis direction.

A extendable and retractable ring 10 is a pressing member that is extendably and retractably movable in the optical axis direction and is formed in a substantially cylindrical shape around the optical axis. Here, as shown in FIG. 3, the extendable and retractable ring 10 is held movably only in the optical axis direction with respect to the exterior ring 2, which is a fixed element configuring the exterior of the lens barrel 100. The inner diameter of the extendable and retractable ring 10 is configured to be larger than that of the exterior ring 2.

A zoom adjusting ring 11 is a member that is rotatable around the optical axis and is formed in a substantially cylindrical shape around the optical axis. The zoom adjusting ring 11 is disposed so as to be interposed between the extendable and retractable ring 10 and the exterior ring 2 in a direction along the optical axis (between the extendable and retractable ring 10a and the exterior ring 2). The zoom adjusting ring 11 is fit to the exterior ring 2 by bayonet coupling. Thus, the zoom adjusting ring 11 is rotatably held around the optical axis to the exterior ring 2. The zoom adjusting ring 11 is configured as a second operation member for moving the extendable and retractable ring 10 in the optical axis direction. The inner diameter of the zoom adjusting ring 11 is larger than the inner diameter of the exterior ring 2.

Adopting such a configuration in which the extendable and retractable ring 10 and the zoom adjusting ring 11, which are components of the operation force adjusting mechanism, are held to the exterior ring 2, eliminates an influence in the arrangement position of the operation force adjusting mechanism due to the arrangement of the fixing components located more toward the inner diameter than the exterior part as in the prior art. Therefore, it is possible to increase the degree of freedom in the arrangement of the operating force adjusting mechanism.

Additionally, if the extendable and retractable ring 10 and the zoom adjusting ring 11 is to be held on the fixing component located more toward the inner diameter than the exterior unit by using the configuration of the first embodiment as in the prior art, the extendable and retractable ring 10 and the zoom adjusting ring 11 need to pass between the exterior ring 2 and the zoom operation ring 9 by extending in the optical axis direction. As a result, the size of the operating force adjusting mechanism increases in the outer diameter direction. Hence, in the first embodiment, the exterior ring 2 holds the extendable and retractable ring 10 and the zoom adjusting ring 11. Accordingly, the size of the operating force adjusting mechanism can be reduced. Additionally, since the operation force adjusting mechanism is independent of the component(s) arranged toward the inner diameter of the exterior component, the exterior component can be configured as an exterior unit, and the assemblability can be improved.

In the zoom adjusting ring 11, a bevel portion 11d provided on the inner circumference abuts (contacts) a bevel portion 10c provided on the outer circumference of the extendable and retractable ring 10. Due to this contact, when the zoom adjusting ring 11 is rotated, the extendable and retractable ring 10 moves in the optical axis direction.

Here, as shown in FIG. 1, a wave washer 12 is disposed between the zoom operation ring 9 and the extendable and retractable ring 10. The wave washer 12 is configured as a first elastic member for transmitting a force (pressing force) to the zoom operation ring 9. A pressing ring 13 for stably transmitting the pressing force of the wave washer 12 to the zoom operation ring 9 is disposed between the wave washer 12 and the zoom operation ring 9.

In the pressing ring 13, a projection (not illustrated) provided on the inner circumference is engaged with a straight groove portion (not illustrated) provided on the zoom operation ring 9. Accordingly, the pressing ring 13 is held movably in the optical axis direction while its rotation in the circumferential direction is prevented.

The wave washer 12 biases the pressing ring 13 backward in the optical axis direction (image plane side). The wave washer 12 applies a pressing force to the zoom operation ring 9 using a biasing force created by this biasing. This biasing force always presses the extendable and retractable ring 10 onto the zoom adjusting ring 11. Accordingly, the pressing force can be applied to the zoom operation ring 9 in accordance with the moving amount of the extendable and retractable ring 10 in the optical axis direction by the rotation of the zoom adjusting ring 11.

In the radial direction, a zoom adjusting rubber 14 is disposed between the zoom operation ring 9 and the extendable and retractable ring 10. The zoom adjusting rubber 14 is configured as a second elastic member that applies a pressing force to the extendable and retractable ring 10. Additionally, at least one or more zoom adjusting rubbers 14 are arranged between the zoom operation ring 9 and the extendable and retractable ring 10, and, in the first embodiment, they are arranged so as to be fixed to the zoom operation ring 9 at three positions at equal intervals in the circumferential direction. The zoom adjusting rubber 14 abuts the end face of the extendable and retractable ring 10 by the extendable and retractable ring 10 moving by a predetermined amount or more due the rotation of the zoom adjusting ring 11. Hence, the zoom adjusting rubber 14 can change a force applied to the extendable and retractable ring 10 in accordance with the moving amount of the extendable and retractable ring 10 in the optical axis direction. In other words, when a distance between the zoom operation ring 9 and the extendable and retractable ring 10 is more than a predetermined value, the zoom adjusting rubber 14 is configured so as not to contact the extendable and retractable ring 10 and does not apply a pressing force to the zoom operation ring 9. The zoom adjusting rubber 14 is brought into contact with the end face of the extendable and retractable ring 10, so that a pressing force can be applied to the zoom operation ring 9.

The extendable and retractable ring 10 moves in the optical axis direction of the optical element by an operation of the zoom adjusting ring 11, whereby the pressing force of the wave washer 12 and the zoom adjusting rubber 14 can be changed.

Hereinafter, a method for adjusting an operation force of the zoom operation ring 9 will be described. As the zoom adjusting ring 11 is rotated clockwise as viewed from the mount side, the extendable and retractable ring 10 moves in a direction approaching the zoom operation ring 9 in the optical axis direction. Accordingly, a compression amount of the wave washer 12 increases. When the compression amount of the wave washer 12 increases, the force by which the pressing ring 13 pushes the extendable and retractable ring 10 also increases. As the pushing force increases, a frictional force between the zoom operation ring 9 and the wave washer 12 increases, and a necessary operation force of the zoom operation ring 9 increases. When the zoom adjusting ring 11 is rotated counterclockwise as viewed from the mount side, the necessary operation force of the zoom operation ring 9 is reduced.

When the zoom adjusting ring 11 is rotated by a predetermined amount or more in the clockwise direction as viewed from the mount side, the zoom adjusting rubber 14 serving as the second elastic member contacts the extendable and retractable ring 10 to generate a pressing force. As a result, the frictional force between the zoom adjusting rubber 14 and the extendable and retractable ring 10 increases and the zoom adjusting rubber 14 is fixed to the zoom operation ring 9, resulting in an increase in the necessary operation force of the zoom operation ring 9. The zoom adjusting rubber 14 is configured to contact the extendable and retractable ring 10 at a part of the movable range of the extendable and retractable ring 10. Therefore, the movable range of the extendable and retractable ring 10 has a first range, which is a range until the zoom adjusting rubber 14 contacts the extendable and retractable ring 10, and a second range, which is a range after the zoom adjusting rubber 14 contacts the extendable and retractable ring 10. The first range is a range in which the wave washer 12 is in contact with the zoom operation ring 9 and the extendable and retractable ring 10, and the zoom adjusting rubber 14 is not in contact with the extendable and retractable ring 10. The second range is a range in which the wave washer 12 is in contact with the zoom operation ring 9 and the extendable and retractable ring 10, and the zoom adjusting rubber 14 is in contact with the extendable and retractable ring 10.

In the first embodiment, the necessary operating force of the zoom operation ring 9 is larger than the necessary operating force of the zoom operation ring 9 obtained only by the wave washer 12 serving as the first elastic member due to the pressure of the zoom adjusting rubber 14. In addition, when the zoom adjusting rubber 14 starts contact, a change amount of the necessary operation force becomes larger than the change amount of the necessary operation force obtained only by using the wave washer 12, the user (operator) is notified that the zoom operation ring 9 is locked.

Since the necessary operation force of the zoom operation ring 9 is changed by rotating the zoom adjusting ring 11, the user rotates the zoom adjusting ring 11 to a position where the necessary operation force that matches a desired the operability of the zoom operation ring 9 can be obtained. When the zoom adjusting ring 11 is rotated by a predetermined amount or more, the zoom operation ring 9 is locked. The locked state of the zoom operation ring 9 prevents a malfunction.

Hereinafter, the main part of the operation force adjusting mechanism in the first embodiment will be described in detail. The extendable and retractable ring 10 has a cylindrical portion 10a serving as a second cylindrical portion, and at least one or more extension portion 10b partially extending in the optical axis direction on its outer circumference. The extension portion 10b is configured as a second extension portion. Additionally, the extendable and retractable ring 10 has at least one or more cutout portions 10d that are partially cut out on the inner diameter. The extendable and retractable ring 10 may be configured by the cutout portions 10d, the cylindrical portion 10a, and the extension portions 10b. The cutout portion 10d is configured as a second cutout portion. In the first embodiment, the extension portions 10b are provided at three positions at equal intervals in the circumferential direction. Subsequently, as shown in FIG. 3, the extension portion 10b of the extendable and retractable ring 10 is inserted through a cutout portion 11c of the zoom adjusting ring 11 so as not to overlap with the extension portion 11b of the extendable and retractable ring 11, which will be described below, and is held movably only in the optical axis direction with respect to the groove portion 2a of the exterior ring 2. The groove portion 2a of the exterior ring 2 is configured as a first holding portion.

As described above, the zoom adjusting ring 11 is disposed so as to be interposed between the extendable and retractable ring 10 and the exterior ring 2 in the optical axis direction. As shown in FIG. 4, the zoom adjusting ring 11 has a cylindrical portion 11a configured as a first cylindrical portion, and at least one or more extension portion 11b partially extending in the optical axis direction and having a bayonet groove, on toe outer circumference (outer circumferential portion). The extension portion 11b is configured as a first extension portion. In the first embodiment, the extension portions 11b are provided at three positions at equal intervals in the circumferential direction. The extension portion 11b is configured as a first projection. Further, the zoom adjusting ring 11 has at least one or more cutout portions 11b that are partially cut out on the inner diameter. The zoom adjusting ring 11 may be configured by the cutout portion 11c, the cylindrical portion 11a, and the extension portion 11b. In the first embodiment, the cutout portions 11c are provided at three positions at equal intervals in the circumferential direction. The cutout portion 11c is configured as a first cutout portion.

The zoom adjusting ring 11 is held by being bayonet-coupled with a bayonet tab 15 (illustrated as a dot in FIG. 4 with a broken line arrow to indicate that the bayonet tab 15 is located on the inside of the exterior ring 2) (a joint part)(the bayonet tab may be an example of a coupling portion) disposed in the exterior ring 2 via bayonet grooves (grooves)(one called out as bayonet groove 16 in FIG. 4) formed in the extension portion 11b (which may be an example of a projecting portion). One of the bayonet grooves is formed to communicate to the end portion of the extension portion 11a, and the other one is formed not to communicate to the end portion. Therefore, the zoom adjusting ring 11 is held to the exterior ring 2 rotatably around the optical axis in a state where the rotational end is determined by the end of the bayonet groove and the extension portion 10b of the extendable and retractable ring 10 (rotation is restricted).

Additionally, in the first embodiment, when the inner diameter of the cylindrical portion 11a is denoted by "R1" and the inner diameter when the inner diameter side of the extension portion 11b configured as the first extension portion is an end is denoted by "R2", the outer diameter of the extension portion 10b configured as the second extension portion is R2 or more and R1 or less.

By the above configuration, the exterior ring 2, the extendable and retractable ring 10, and the zoom adjusting ring 11 can be arranged to prevent three or more components being overlapped on the entire circumference in the radial direction.

As described above, the zoom adjusting rubber 14 is disposed between the zoom operation ring 9 and the extendable and retractable ring 10 and is fixed to the zoom operation ring 9. The cutout portion 10d is provided on the inner circumference of the cylindrical portion 10a of the extendable and retractable ring 10 and consists of groove portions provided at three positions at equal intervals in the circumferential direction on the object side and an annular portion provided on the entire circumference. The extendable and retractable ring 10 is assembled to the zoom operation ring 9 from the image plane side in the optical axis direction, and, as shown in FIG. 4, assembly is performed to insert the zoom adjusting rubber 14 through the groove portion of the cutout portion 10d of the extendable and retractable ring 10. The annular portion of the cutout portion 10d is used for the passage of the zoom adjusting rubber 14 when the zoom operation ring 9 rotates. When an innermost diameter of the extendable and retractable ring 10 is denoted by "R3" and an inner diameter when the inner circumferential side of the cutout portion 10d is the end is denoted by "R4", the distance from the outer diameter to the center of the zoom adjusting rubber 14 is R3/2 or more and R4/2 or less.

As described above, a configuration is used in which the extension portion 10b is provided in the extendable and retractable ring 10, the extension portion 11b and the cutout portion 11c are provided in the zoom adjusting ring 11 and the extendable and retractable ring 10 and the zoom adjusting ring 11 is held against the exterior ring 2, and as a result, the number of components that overlaps on the entire circumference in the radial direction can be reduced, and the size of the lens barrel 100 in the radial direction can be reduced. Additionally, by providing the cutout portion 10d for the passage of the zoom adjusting rubber 14 through the zoom operation ring 9, the increase in the mechanism caused by disposing the zoom adjusting rubber 14 can be suppressed, and the size of the lens barrel 100 can be reduced.

As described above, according to the first embodiment, it is possible to provide a lens barrel 100 having a small operation force adjusting mechanism in which the degree of freedom of arrangement is increased.

Second Embodiment

As the second embodiment, a modified example of the operation force adjusting mechanism described in the first embodiment will be described below, referring to FIG. 5 to FIG. 8. In the second embodiment, a description will be given by using reference numerals that have already been used for the components that are the same as those in the first embodiment.

Figure 5:
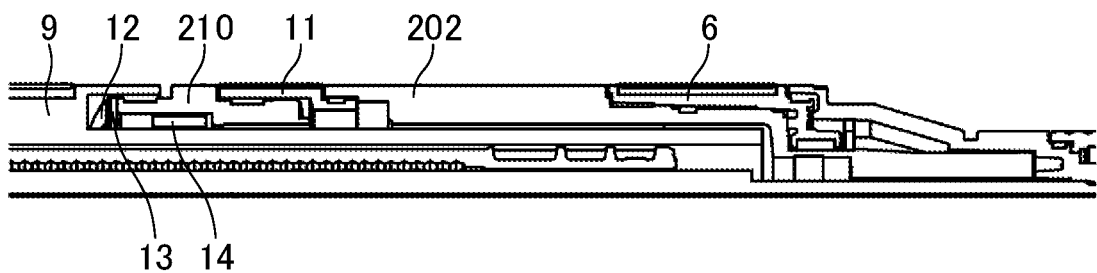
FIG. 5 is an enlarged partial cross-sectional view of the lens barrel of the second embodiment.
Figure 6:
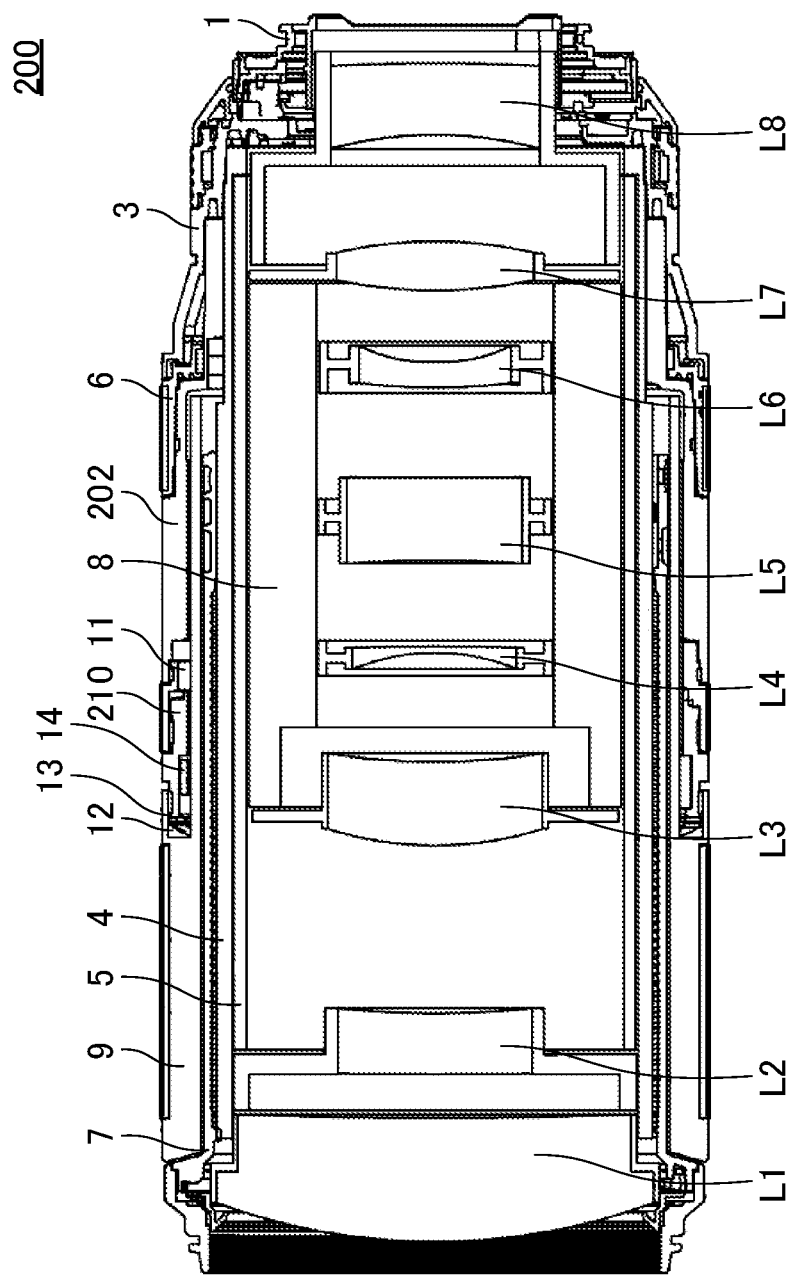
FIG. 6 is a cross-sectional view showing the lens barrel of the second embodiment.
Figure 7:
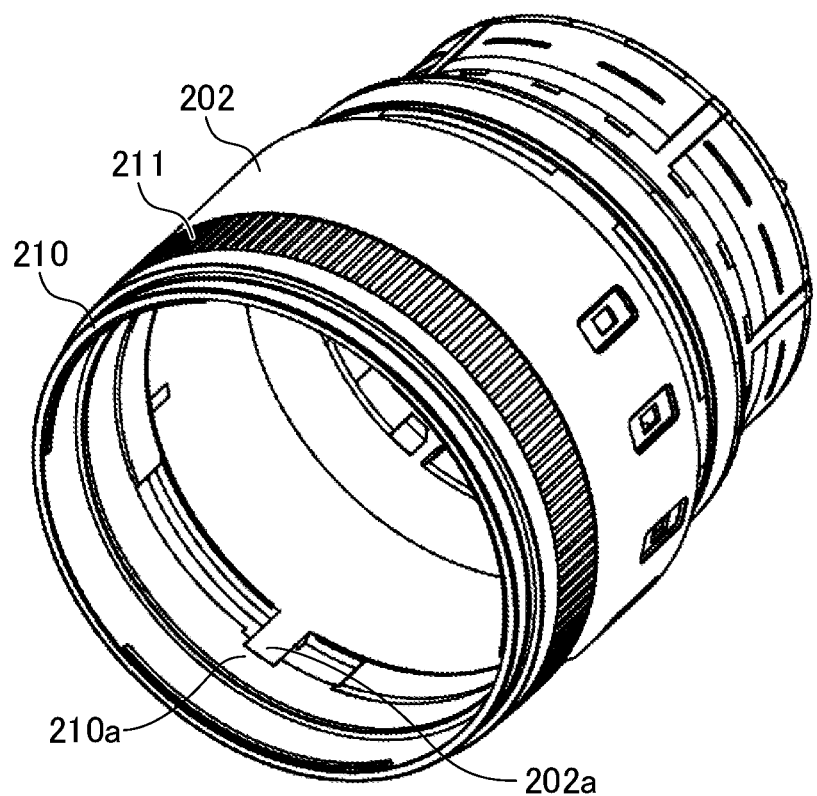
FIG. 7 is a perspective view of the main part of the operation force adjusting mechanism of the second embodiment as viewed from the inner diameter side.
Figure 8:
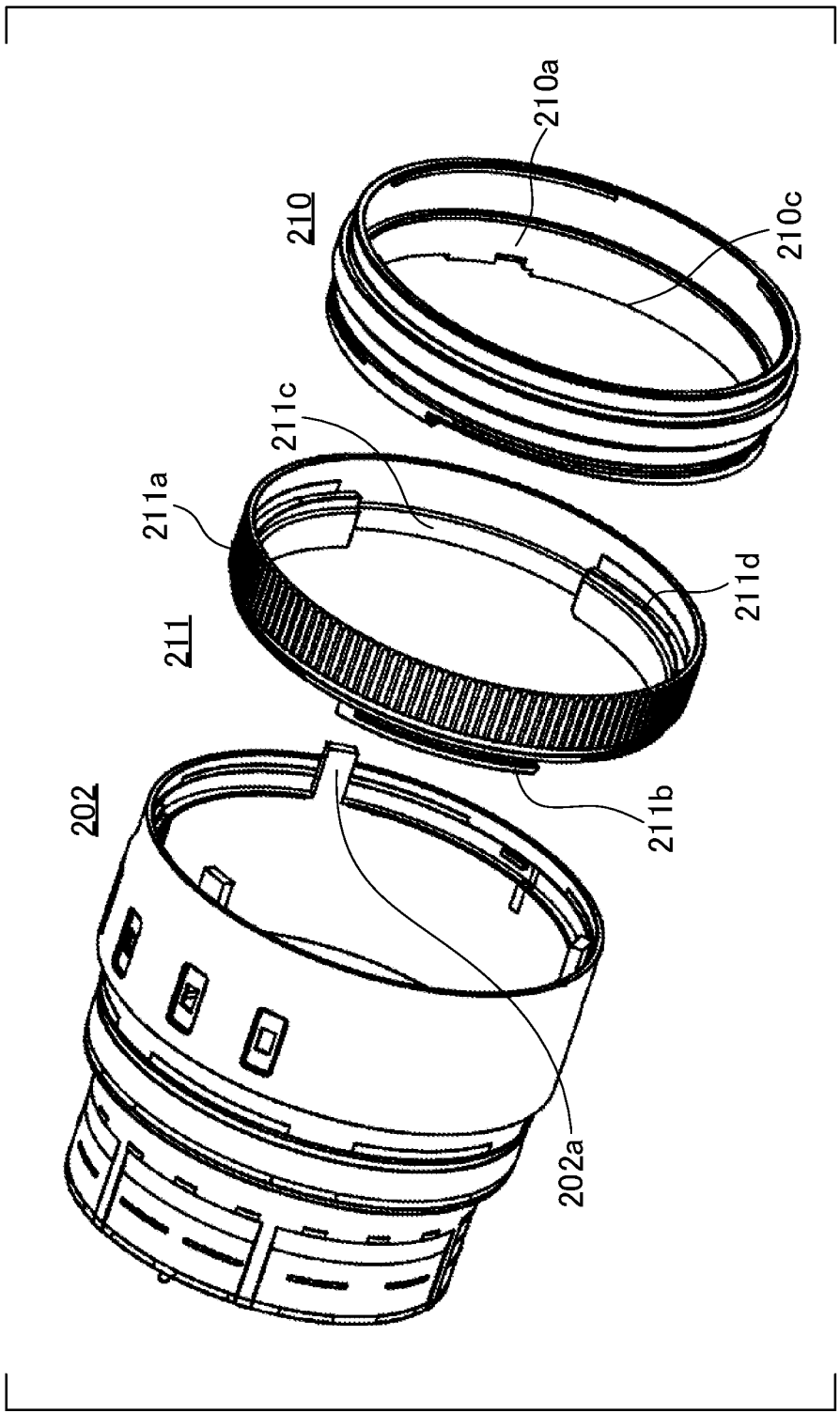
FIG. 8 is an exploded perspective view showing the main part of the operation force adjusting mechanism of the second embodiment.

FIG. 5 is a partially enlarged cross-sectional view of the lens barrel 200 in the second embodiment. FIG. 6 is a cross-sectional view of the lens barrel 200 in the second embodiment. FIG. 7 is a perspective view of the main part of the operation force adjusting mechanism of the second embodiment as viewed from the inner diameter side. FIG. 8 is an exploded perspective view of the main part of the operation force adjusting mechanism of the second embodiment.

In the second embodiment, the exterior ring 2, the extendable and retractable ring 10, and the zoom adjusting ring 11 of the first embodiment are modified so as to be an exterior ring 202, an extendable and retractable ring 210, and a zoom adjusting ring 211, which will be described below. Hence, the description of the same configuration as in the first embodiment will be omitted.

As shown in FIG. 6, the lens barrel 200 is a member configured as the body of the lens barrel 200. As shown in FIG. 5, the components of the operation force adjusting mechanism in the second embodiment are arranged in the same order as the components of the first embodiment.

In the second embodiment, the exterior ring 202 has an extension portion 202a configured as a third projection portion. The extendable and retractable ring 210 has a groove portion 210a configured as a second holding portion. In the second embodiment, the groove portions 210a are provided at three positions at equal intervals in the circumferential direction. As shown in FIG. 7 and FIG. 8, the extension portion 202a of the exterior ring 202 is inserted through a cutout portion 211c of the zoom adjusting ring 211, which will be described below, and is held at the groove portion 210a of the extendable and retractable ring 210. The extension portion 202a of the exterior ring 202 is held at the groove portion 210a of the extendable and retractable ring 210, and thereby the extendable and retractable ring 210 is disposed movably only in the optical axis direction with respect to the exterior ring 202.

As described above, the zoom adjusting ring 211 is disposed so as to be interposed between the extendable and retractable ring 210 and the exterior ring 202 in the optical axis direction. As shown in FIG. 8, the zoom adjusting ring 211 is configured by a cylindrical portion 211a, an extension portion 211b that partially extends in the optical axis direction and has a bayonet groove, and the cutout portion 211c that is partially cut out at the inner diameter side of the zoom adjusting ring 211. In the second embodiment, the extension portion 211b and the cutout portion 211c are provided at three positions at equal intervals in the circumferential direction. Additionally, the extension portion 211b is configured as a fourth projection. The zoom adjusting ring 211 is held by being bayonet-coupled with a bayonet tab (not illustrated) arranged on an exterior ring 211 via a bayonet groove arranged on the extension portion 211b. Additionally, the zoom adjusting ring 211 is held rotatably around the optical axis with respect to the exterior ring 202 in a state where the rotational end thereof is determined by the end of the bayonet groove and the extension portion 202a of the exterior ring 202.

By the above configuration, the exterior ring 202, the extendable and retractable ring 210, and the zoom adjusting ring 211 can be arranged so that no more than three components overlap on the entire circumference in the radial direction.

Thus, the exterior ring 202 is provided with the extension portion 202a, the zoom adjusting ring 211 is provided with the extension portion 211b and the notched portion 211c, and the extendable and retractable ring 210 is provided with the groove portion 210a. Hence, even in a configuration in which the extension portion 202a is inserted through the cutout portion 211c and held at the groove portion 210a, it is possible to provide the lens barrel 200 having a small operation force adjusting mechanism in which the degree of freedom of arrangement is improved in the same manner as in the first embodiment.

In the above embodiments, although the wave washer 12 is selected as the first elastic member, a configuration using a friction clutch may be used. Specifically, it suffices if a pressing force applied to the zoom operation ring 9 is changed by rotating the zoom adjusting ring 11 and the zoom adjusting ring 211.

In the above embodiments, although rubber is selected as the second elastic member, a plate spring or a wave washer may be used or any member may be used if the member is elastically deformed so as to change a pressing force applied to the zoom operation ring 9.

In the above embodiments, although three zoom adjusting rubbers 14 are arranged in the circumferential direction, at least one or more zoom adjusting rubbers 14 may be arranged, or three or more zoom adjusting rubbers 14 may be arranged. It is desirable that the zoom adjusting rubbers 14 are arranged at equal intervals.

Although the operation force adjusting mechanism that adjusts the operation force of the zoom operation ring 9 has been described in the above embodiments, the operation force adjusting mechanism may be applied to other operation rings such as a focus operation ring to adjust the operation force.

Additionally, in the above embodiments, although the extendable and retractable ring 10 is moved by using the bevel portions of the extendable and retractable ring 10 and the zoom adjusting ring 1 another means may be used to perform the moving means of the extendable and retractable ring 10.

Although the operation force adjusting mechanism in the above embodiments has been described in a case in which the operation force adjusting mechanism is applied to the lens barrel, the operation force adjusting mechanism can be applied to other optical apparatus such as a lens integrated type image pickup apparatus.

While the present invention has been described with reference to exemplary embodiments, it is to be understood that the invention is not limited to the disclosed exemplary embodiments. The scope of the following Claims is to be accorded the broadest interpretation so as to encompass all such modifications and equivalent structures and functions.

This application claims the benefit of Japanese Patent Application No. 2020-089830, filed May 22, 2020, which is hereby incorporated by reference wherein in its entirety.

What is claimed is:

1. A lens apparatus comprising:
a first operation member configured to move an optical element along an optical axis direction of an optical axis of the optical element;
a first elastic member configured to transmit a force to the first operation member ;
a pressing member configured to change a force applied to the first elastic member according to the movement along the optical axis direction;
a second operation member configured to move the pressing member along the optical axis direction; and
a fixed element configuring at least a part of an exterior unit,
wherein the pressing member is movably held by the fixed element along the optical axis direction, and the second operation member is rotatably held by the fixed element,
wherein the second operation member comprises a first cylindrical portion configuring a part of the exterior unit, and comprises at least one or more projecting portions formed on the inner diameter side of the first cylindrical portion and projecting in a direction along the optical axis, and
wherein a coupling portion of the fixed element that holds the one or more projecting portions is formed on the inner circumferential side of the fixed element.

2. The lens apparatus according to claim 1,
wherein the second operation member has a substantially cylindrical shape around the optical axis.

3. The lens apparatus according to claim 1,
wherein each of the one or more projecting portions is formed with at least a groove portion configured to couple to the coupling portion, and one side of the groove portion is formed to communicate with an end portion of the projecting portion, and another side of the groove portion does not communicate with the end portion.

4. The lens apparatus according to claim 1,
wherein the pressing member has a substantially cylindrical shape around the optical axis, and its outer circumferential portion includes a second cylindrical portion configuring a part of the exterior unit.

5. The lens apparatus according to claim 4,
wherein any one of the pressing member and the fixed element includes at least one or more extension portions projecting in a direction along the optical axis.

6. The lens apparatus according to claim 5, wherein the extension portion is inserted through a first cutout portion that is partially cut out on the inner diameter side of the second operation member so as not to overlap the projecting portion, and is held by a holder formed at the inner diameter side of either the fixed element or the pressing member, which does not include the extension portion.

7. The lens apparatus according to claim 6, wherein the second operation member is a member to be rotated, and the rotation of the second operation member is restricted by the extension portion.

8. The lens apparatus according to claim 5, wherein, where the inner diameter of the first cylindrical portion is denoted by R1 and an inner diameter if the inner circumferential side of the projecting portion is an end is denoted by R2, the outer diameter of the extension portion is R2 or more and R1 or less.

9. The lens apparatus according to claim 1, wherein an inner diameter of the pressing member and the second operation member is larger than an inner diameter of the fixed element.

10. The lens apparatus according to claim 1, wherein no more than two of the pressing member, the second operation member, and the fixed element overlap radially along an entire circumference of the exterior unit.

11. The lens apparatus according to claim 1 comprising a second elastic member configured to change a force applied to the pressing member in accordance with a moving amount of the pressing member along the optical axis direction, wherein at least one or more second elastic members are disposed between the first operation member and the pressing member.

12. The lens apparatus according to claim 11, wherein the pressing member has at least one or more second cutout portions on the inner diameter, and wherein the second elastic member is disposed at the inner diameter side of the pressing member to be inserted through the second cutout portion.

13. The lens apparatus according to claim 12, wherein, where an innermost diameter of the pressing member is denoted by R3 and an inner diameter if the inner circumferential side of the second cutout portion is an end is denoted by R4, a distance from the outer diameter to the center of the second elastic member is R3/2 or more and R4/2 or less.

* * * * *